Feb. 2, 1971    W. E. McHUGH    3,560,339
FUEL ELEMENTS
Filed May 12, 1967
Fig.1.
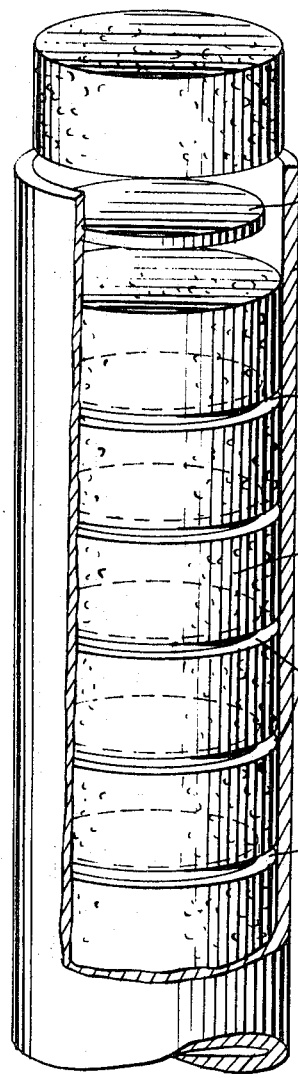
Fig.2.
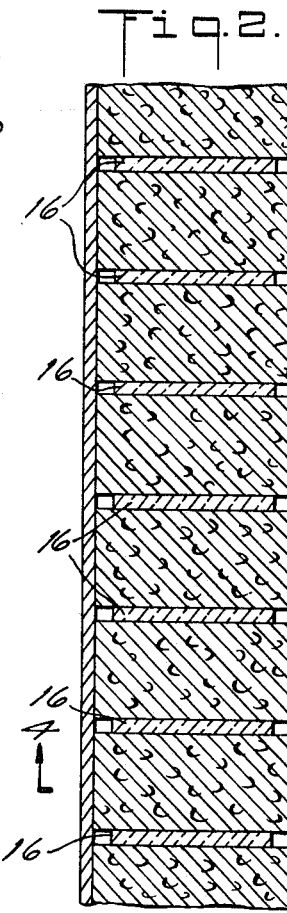
Fig.3.
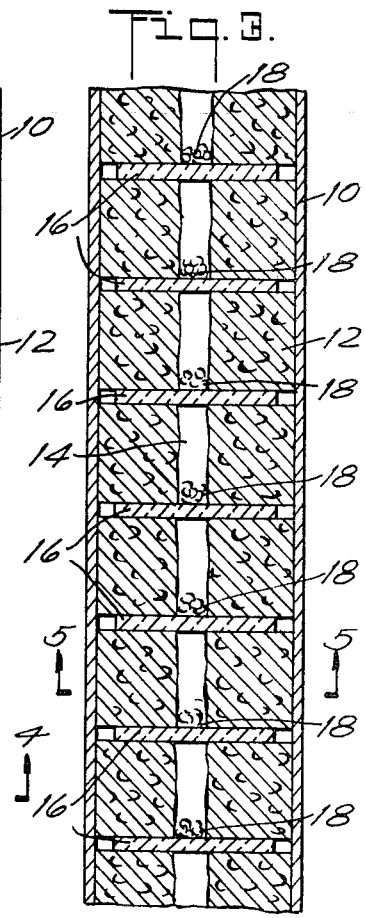
Fig.4.
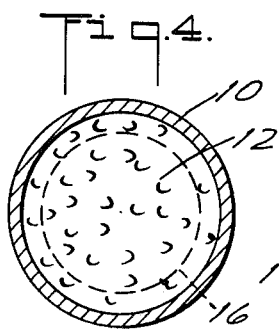
Fig.5.
Fig.6.
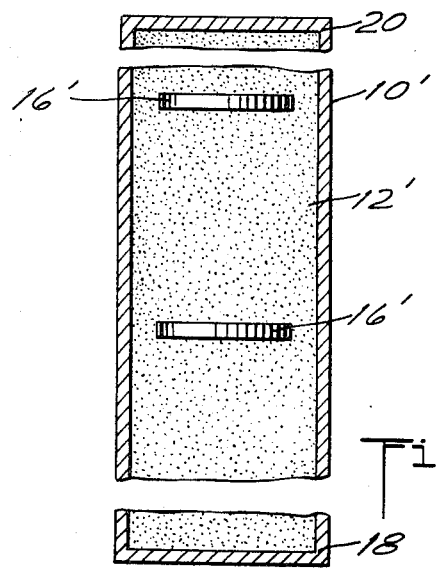
INVENTOR.
WILLIAM E. McHUGH
BY
Ward, Haselton, McElhannon, Brooks, & Fitzpatrick
ATTORNEYS

3,560,339
FUEL ELEMENTS
William E. McHugh, Rochester, Mich., assignor to Atomic Power Development Associates, Inc., Detroit, Mich., a corporation of New York
Filed May 12, 1967, Ser. No. 637,947
Int. Cl. G21c 3/34
U.S. Cl. 176—76                    5 Claims

ABSTRACT OF THE DISCLOSURE

A nuclear reactor fuel element having an elongated tubular cladding which contains fuel particles and a disc of smaller diameter than the internal diameter of the cladding.

---

This invention has to do with nuclear reactors, and more particularly, with fuel elements for use in fast nuclear reactors.

In accordance with my invention, I have found that when a fast nuclear reactor ceramic fuel element is brought up to its operating temperature, such as in excess of about 1600° C., the fuel material has a tendency to relocate radially outwardly forming a central axial void. The size and time within which this void occurs, of course, depends upon the power level and design of the reactor core. The diameter of the axial void may be of the order of about 25% of the diameter of the fuel pin. This may occur with nuclear fuels which are at less than their theoretical densities in their pre-operational state. It is particularly applicable to ceramic fuels such as oxide and carbide base fuels. After formation of the void, particles of the fuel material disposed adjacent this void tend to breakaway and fall into the void forming a pile of material towards the bottom of the fuel pin, thereby providing an excessive concentration of fuel material which, in turn, may produce excessive uncontrolled heat. Also, the particles may build up at some intermediate point along the axial void due to the fact that some particles may be large enough to plug the void and thereby start an intermediate accumulation of fuel material, which may form a hot spot at the intermediate point, and could cause failure of the adjacent cladding.

As far as I know, no satisfactory solution has been presented for the aforementioned problem, per se. However, certain prior art structures did unknowingly solve this problem to some extent, but they created other additional problems.

Heretofore, in nuclear reactor fuel elements, it has been proposed to insert plugs or discs between measured quantities of fuel material. The plugs were in engagement with the cladding and usually were fabricated from the same material. Also, such plugs were generally brazed or welded to the cladding, and in other instances the plugs were peripherally cold-welded or wedged into connection with the cladding. These plugs served to compartmentalize the fuel element and prevent contamination of the entire fuel element in the event that there was a rupture of the cladding. Also, these plugs served to improve the heat transfer from the fuel to the tubing. According to the prior art, a relatively thick plug or disc was required in order to weld or secure same to the cladding. Also, a thick plug was required due to the thermal stresses set-up during operation. In some instances this is a disadvange.

Another disadvantage of the prior art structures was that they were time-consuming and expensive to fabricate. That is, it was an expensive and complicated procedure to insert a charge of fuel into the tube or cladding and then wedge, weld or fuse an internal plug prior to inserting a second charge of fuel, the foregoing procedure being repeated until the tube was filled.

I have conceived by my invention an effective solution to the problems presented through a construction that is efficient and yet relatively simple.

In essence, I contribute by my invention a new and improved fuel element having an elongated tubular cladding containing a plurality of fuel particles plus at least one disc peripheral diameter is smaller than the inside diameter of the cladding. In one form of my invention the discs subdivide the fuel element into thirds. From a theoretical standpoint of preventing positive reactivity, two discs which divide the fuel pin into thirds recovers approximately 80% of the positive reactivity insertion due to fuel relocation, and the addition of two more discs would only recover an additional 10%.

According to another form of my invention, the discs are spaced of the order of between about 2 inches and about 4 inches, one from the next adjacent one. In this case the distance between the discs is based on mechanical considerations, such as the strength of the materials and the power of fuel element, for example. As pointed out hereinbefore, the particles may build up at some intermediate point along the axial void and start an intermediate accumulation of fuel material. In order to prevent uncontrolled intermediate build-up, it is preferable to space the discs between about 2 inches and about 4 inches one from the next adjacent one.

As a feature of my invention, the discs which are interposed in the fuel element are preferably wafer thin and may have a thickness less than 1/8 inch. It will be appreciated that the prior art structure required thick discs for mechanically connecting them to the cladding side wall. Accordingly, my structure takes up substantially less, valuable core area.

As another feature of this invention, the discs have a diameter of the order of between about 50% and about 75% of the inside diameter of the cladding. As pointed out hereinbefore, the purpose of the disc of my invention is to prevent particles from passing down the axial void in the fuel pin, and hence, the disc need be only of sufficient diameter to cover the void. This means that less active fuel material in the core is displaced by the disc.

Further, the assembly of the fuel pin, according to the invention is substantially easier than with prior art constructions. That is, one end of the tubular cladding is sealed and then the fuel material is inserted. The fuel may be in any convenient form such as pellets or powder, for example. If the fuel is in the form of powder then the next step comprises vibropacking the charge of fuel. Thereafter, the wafer-thin disc whose periphery is substantially smaller in diameter than the inside diameter of the cladding is inserted. This procedure is repeated until the tube is filled, and then the open end of the tube is sealed. It will be appreciated that the discs are merely slipped into place without the expensive, time-consuming necessity of affixing them to the cladding.

As still another feature of my invention, the discs may be fabricated from any compatible material with respect to the cladding material. In one form of the invention, the cladding material is chosen from the class consisting of zirconium and stainless steel; and the material of the disc is chosen from the group consisting of a ceramic, tungsten, unalloyed-molybdenum, and tantalum. In one preferred embodiment, the material of the disc is tungsten.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures carrying out the several purposes of the invention. It is important, therefore, that the claims be regarded as including such equivalent constructions as do not depart from the spirit and scope of the invention.

Several embodiments of the invention have been chosen for the purposes of illustration and description, and are shown in the accompanying drawings, forming a part of the specification, wherein:

FIG. 1 is a side elevation, partially broken away to reveal the internal construction of a fuel element constructed in accordance with my invention;

FIG. 2 is a longitudinal section view showing the fuel particles and spaced discs in a fuel assembly as originally assembled;

FIG. 3 is a longitudinal sectional view similar to FIG. 2, but showing the assembly after the nuclear reactor has been brought up to operating temperature;

FIG. 4 is a sectional view taken along the line 4—4 of FIG. 2;

FIG. 5 is a sectional view taken along the line 5—5 of FIG. 3; and

FIG. 6 is a longitudinal sectional view of another form of fuel element according to my invention wherein the fuel material is in the form of powder.

In the embodiment of the invention shown in FIGS. 1-3, there is illustrated a nuclear reactor fuel element comprising an elongated tubular cladding 10 containing a plurality of fuel particles 12 which may be pellets, for example. FIGS. 1, 2 and 4 show the fuel particles in their original locations. When the fuel is brought up to operating temperature, such as in excess of about 1600° C., the fuel material moves radially outwardly, thereby forming a central axial void 14 as shown in FIGS. 3 and 5. This void varies in diameter depending upon the fuels employed and the operating conditions, and it may have a diameter of about 25% of the diameter of the fuel pin.

A plurality of wafer-thin discs 16 are disposed in longitudinally spaced attitude within the tubular cladding. These discs are very thin and may have a thickness less than 1/8 inch, for example, it being desirable that the discs are thin so that they consume a minimum of core volume. As best seen in FIGS. 2 and 3, these discs have outside diameters substantially less than the inside diameters of the cladding 10. Preferably, the discs have diameters between about 50% and about 75% of the inside diameter of the cladding. Actually, the discs 16 need be only of sufficient diameter that they will be sure and cover the central axial void 14.

As pointed out hereinbefore, the discs may be spaced so that the fuel element is divided into thirds. Alternately, the discs may be spaced between about 2 inches and about 4 inches one from the next adjacent one, so that they will each catch relatively few particles 18 (FIG. 3) of fuel material. It will be appreciated that the discs are spaced sufficiently close together so that the build-up on any one disc will not be sufficient to cause uncontrolled intermediate build-up and possible failure of the adjacent cladding.

The cladding 10 is preferably fabricated from zirconium or stainless steel, and the discs are fabricated from a compatible material, such as from the class consisting of a ceramic, tungsten, unalloyed molybdenum and tantalum, with tungsten being the presently preferred material.

Further, as best seen in FIG. 6, the fuel material 12' may be in powder form. According to my invention the fuel element is fabricated by sealing one end of the tubular cladding 10'; as at 18, and then inserting a charge of powdered fuel 12' therein. After that the charge is vibropacked. Then a wafer-thin disc 16', having a periphery substantially smaller in diameter than the inside diameter of said cladding 10', is inserted. Then, additional charges of powder are inserted and vibropacked and additional discs are inserted until the tube is filled. Thereafter, the other end of the cladding is sealed such as at 20 and the fuel element is completed. If desired, a space may be left at one end of the tube for the expansion of gases during operation.

From the foregoing description, it will be seen that the present invention contributes a new and improved fuel element and method for fabricating same which effectively and simply overcomes the problems encountered with fuel elements having centrally located voids formed during radiation.

Although certain particular embodiments of the invention have herein been described for purposes of explanation, further modifications thereof, after study of this specification will be apparent to those skilled in the art to which the invention pertains. Reference accordingly should be had to the appended claims in determining the scope of the invention.

What is claimed and desired to be secured by Letters Patent is:

1. A fast nuclear fuel element comprising an elongated tubular cladding, a plurality of fuel compacts disposed within said tubular cladding, a plurality of longitudinally spaced discs disposed within said cladding intermediate the ends thereof, said fuel compacts being interposed between said discs, said discs being impervious with respect to said fuel compacts, and each of said discs having a thickness less than about 1/8 inch and a diameter between about 50% and about 75% of the inside diameter of said cladding, whereby said discs are free for longitudinal movement with respect to said cladding.

2. The fuel element according to claim 1, wherein said discs subdivide said fuel element substantially in thirds.

3. The fuel element according to claim 1, wherein said discs are spaced of the order of between about 2 inches and about 4 inches, one from the next adjacent one.

4. The fuel element according to claim 1, wherein the material of said cladding is of the class consisting of zirconium and stainless steel, and material of said disc is of the class consisting of tungsten, unalloyed molybdenum and tantalum.

5. A fuel element according to claim 1, wherein the material of said disc is tungsten.

References Cited

UNITED STATES PATENTS

| | | | |
|---|---|---|---|
| 2,947,080 | 8/1960 | Kates et al. | 176—76X |
| 3,092,901 | 6/1963 | Sharples | 176—73X |
| 3,129,140 | 4/1964 | Stohr et al. | 176—76 |
| 3,184,392 | 5/1965 | Blake | 176—76X |
| 3,230,152 | 1/1966 | Kerze, Jr. | 176—76 |
| 3,252,868 | 5/1966 | Perilhou et al. | 176—76X |
| 3,260,649 | 7/1966 | Jens et al. | 176—76X |
| 3,274,067 | 9/1966 | Greebler et al. | 176—76X |

FOREIGN PATENTS

| | | | |
|---|---|---|---|
| 37–6,499 | 6/1962 | Japan | 176—76 |

BENJAMIN R. PADGETT, Primary Examiner

M. J. SCOLNICK, Assistant Examiner

U.S. Cl. X.R.

176—74, 68